United States Patent Office 3,484,435
Patented Dec. 16, 1969

3,484,435
ESTRA-TRIENE-PYRAZOLES AND A METHOD FOR THEIR PREPARATION
Pietro de Ruggieri, Carmelo Gandolfi, and Umberto Guzzi, Milan, Italy, assignors to Ormonoterapia Richter S.p.A., Milan, Italy, a corporation of Italy
No Drawing. Continuation of application Ser. No. 573,822, Aug. 22, 1966. This application Mar. 18, 1969, Ser. No. 808,308
Claims priority, application Italy, Aug. 23, 1965, 18,858/65
Int. Cl. C07c *173/10, 167/00;* A61k *27/00*
U.S. Cl. 260—239.5                4 Claims

ABSTRACT OF THE DISCLOSURE

There are provided [2,3-d]-pyrazoles of steroid compounds of the estrane, 19-nor-pregnane and 19-nor-cholestane series which are aromatic in ring A, the pyrazole ring being substituted or unsubstituted.

The compounds exhibit estrogenic, cortical, anti-cholesterolemic and hypophysis-blocking activity.

---

This application is a continuation of application Ser. No. 573,822, filed on Aug. 22, 1966, now abandoned.

This invention relates to the compounds of the following formula:

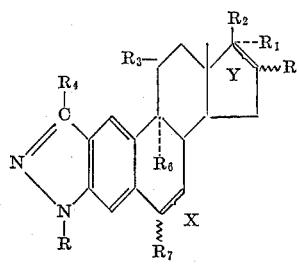

wherein:
R is H, lower alkyl, Cl, Br, I, F, OH or keto, and the substituent, being monofunctional, is in the α- or β-configuration;
$R_1$ is single H, lower alkyl, —CH=CH—$R_a$ being H or lower alkyl, —C≡C—$R_a$ with $R_a$ having the meaning given above, hydroxy, 2′-tetrahydropyranyloxy or acyloxy in which the acyl radical is derived from a saturated or unsaturated aliphatic carboxylic acid having 2 to 10 C atoms;
$R_2$ is singly H, OH, 2′-tetrahydropyranyloxy, lower alkoxy, acyloxy in which the acyl radical is derived from a saturated or unsaturated monocarboxylic aliphatic acid having 2 to 10 C atoms or succinic, glutaric, phenyl-acetic, phenyl-propionic, phenyl-propiolic, cinnamic, benzoic or salicylic acids, —$C_8H_{17}$, —$COCH_3$,

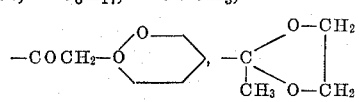

—$COCH_2OH$, —$COCH_2O$-acyl in which the acyl radical is derived from a saturated or unsaturated aliphatic monocarboxylic acid having 2 to 10 C atoms or succinic, glutaric, phenyl-acetic, phenyl-propionic, phenyl-propiolic, cinnamic, benzoic or salicylic acid;
$R_1$ and $R_2$ together are 17-keto, 17,17-ethylenedioxy or 17α,20:20,21-bismethylenedioxy;
$R_3$ is hydrogen, α-hydroxy, β-hydroxy or keto;
$R_4$ is hydrogen, lower alkyl, hydroxy, iodo, amino, acyloxy in which the acyl radical is derived from a saturated or unsaturated aliphatic monocarboxylic acid having 2 to 10 C atoms, lower alkoxy, —$COCH_3$, or —$COOR_b$ in which $R_b$ is H, lower alkyl, —$CONH_2$, —$CONHNH_2$, —$CON_3$, or —$COCl$;
$R_5$ is hydrogen, lower alkyl, phenyl, or o- or p-substituted phenyl;
$R_6$ is H, Cl, F, or Br;
$R_7$ is H, α- or β-methyl, α- or β-Cl, or α- or β-F; and
X and Y are each a single or a double bond.

It is to be understood that these compounds exist in a state of equilibrium according to the following equation:

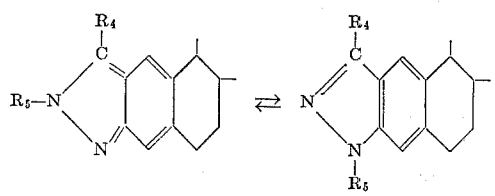

[E. H. Rodd, Chemistry of Carbon Compounds, vol. IVa (1957), pp. 278–281]. Also, it is to be understood that being mesomeric, the aromatic form of the compound can be a 1,3,5(10)-triene as well, and in the appended claims while the 2,4,10(1)-triene configuration is shown in the formulae, it is intended that their coverage extend to the other forms of the compounds.

These compounds, which show an estrogenic, cortical, anti-cholesterolemic, hypophysis-blocking activity, are prepared by dehydrogenation and aromatization in the presence of hydrogen acceptors such as chloranyl, 2,3-dicyano-5,6-dichloro-benzoquinone or an ethylenic compound such as the ethyl or methyl ester of maleic, fumaric, or cinnamic acid, styrene or stilbene, with or without the aid of Pd/C or Pt/C as a hydrogen transfer agent in a solvent, such as benzene, dioxane, iso-octane, acetone, ethylene glycol, or mineral oil, of compounds of the following formulae:

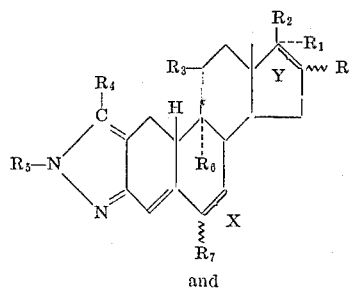

and

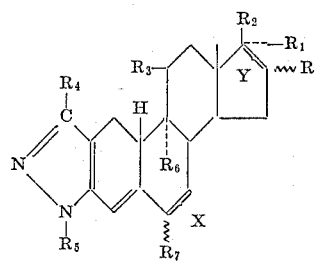

wherein R, $R_1$ and $R_2$, singly and together, $R_3$, $R_4$, $R_5$, $R_6$, $R_7$, X and Y have the meanings given above.

The compounds, which are the object of this invention, are also obtained from a compound of the following formula:

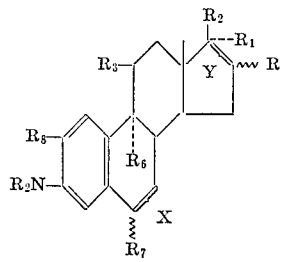

wherein R, $R_1$ and $R_2$, singly and together, $R_3$, $R_6$, $R_7$, X and Y have the meanings given above and $R_8$ is —C≡N, —CHO,

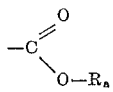

where $R_a$ is hydrogen or lower alkyl,

or

Such a compound, according to the following scheme, is reacted with nitrous acid to give a 3-diazo-2-substituted-estra-1,3,5(10)-triene, and this latter compound is reduced to a 3-hydrazine-derivative, which cyclizes spontaneously or is cyclized to an estra - 2,4,10(1) - triene-(2,3-d)-3′-pyrazole:

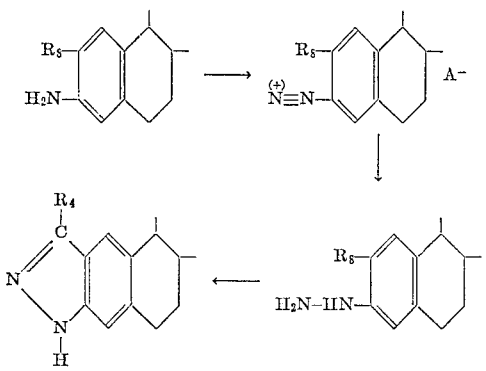

The following examples serve to illustrate the invention but are not intended to limit it in any way.

EXAMPLE 1

Estra-2,4,10(1)-triene-17β-ol-[2,3e-d]-pyrazole

A solution of 0.5 part of estra - 4 - ene-17β-ol-[3,2-c]-pyrazole in 50 parts of dioxane is refluxed under stirring with 0.7 part of diethyl maleate and 1 part of 10% Pd/C. The catalyst is filtered off, the filtrate is evaporated to dryness, 10 parts of potash, 2.5% solution in methanol, are added to the residue and refluxed for 2 hours. The resulting solution is concentrated to a small volume, and diluted with benzene.

The organic phase which separates is thoroughly washed with alkali and with water to neutrality, and evaporated to dryness to give, after crystallization from acetone, 0.41 part of estra-2,4,10(1)-triene-17β-ol-[2,3-d]-pyrazole M.P. 170–173° C. $\lambda_{max}$. 260, 266, 289, 305 mμ.

In a similar manner, by starting from the corresponding [3,2-c]-pyrazoles of Δ⁴-19-nor-steroids, the following compounds have also been prepared:

17α-methyl-estra-2,4,10(1)-triene-17β-ol-[2,3-d]-pyrazole
17α-ethynyl-estra-2,4,10(1)-triene-17β-ol-[2,3-d]-pyrazole
19-nor-cholesta-2,4,10(1)-triene-[2,3-d]-pyrazole
19-nor-pregna-2,4,10(1)-triene-17α-ol-20-one-[2,3-d]-pyrazole
19-nor-pregna-2,4,10(1)-triene-17α,21-diol-20-one-[2,3-d]-pyrazole
19-nor-pregna-2,4,10(1)-triene-17α,21-diol-20-one-[2,3-d]-pyrazole-21-acetate.

EXAMPLE 2

17α-ethyl-estra-2,4,10(1)-triene-17β-ol-[2,3-d]-1′-methyl-pyrazole

A solution of 1.2 parts of 17α-ethyl-estra-4-en-17β-ol-[3,2-c]-1′-methyl-pyrazole in 60 parts of dioxane is refluxed for 30 hours with 1.2 parts of methyl maleate and 2 parts of 10% Pd/C. The catalyst is filtered off, and the filtrate is evaporated to dryness. The residue is leached with petroleum ether and crystallized from acetone: ethyl ether to give 0.82 part of 17α-ethyl-estra-2,4,10(1)-triene-17β-ol-[2,3-d]-1′-methyl-pyrazole; $\lambda_{max}$. 257, 263, 272, 293, 299, 304, 312 mμ (1 g. ϵ=3.81; 3.85; 3.81; 3.73; 4.74; 3.72; 3.64).

In an analogous manner the following compounds were prepared:

estra-2,4,10(1)-triene-17β-ol-[2,3-d]-1′-methyl-pyrazole M.P. 191–193° C.
estra-2,4,10(1)-triene-17β-ol-[2,3-d]-1′-methyl-pyrazole-17-acetate
estra-2,4,10(1)-triene-17β-ol-[2,3-d]-1′-methyl-pyrazole-17-phenyl-propionate
19-nor-pregna-2,3,10(1)-triene-20-one-[2,3-d]-1′-methyl-pyrazole
6α-methyl-19-nor-pregna-2,4,10(1)-triene-17α-ol-20-one-[2,3-d]-1′-methyl-pyrazole
6α,16β-dimethyl-19-nor-pregna-2,4,10(1)-triene-17α,21-diol-20-one-[2,3-d]-1′-methyl-pyrazole
19-nor-cholesta-2,4,10(1)-triene-[2,3-d]-1′-methyl-pyrazole.

EXAMPLE 3

Estra-2,4,10(1)-triene-17β-ol-[2,3-d]-1′-methyl-pyrazole-17-acetate 0.6 part of estra-4-en-17β-ol-[3,2-c]-1′-methyl-pyrazole-17-acetate are dissolved in 40 parts of dioxane and 1.2 parts of styrene and refluxed with 0.9 part of 10% Pt/C. The catalyst is filtered off, and the filtrate is evaporated to dryness. The residue is chromatographed on alumina and there are separated from the (3:2)hexane: ethyl ether fractions, 0.41 part, estra-2,4,10(1)-triene-17β-ol-[2,3-d]-1′-methyl-pyrazone-17-acetate; $\lambda_{max}$ 273, 291, 296 mμ (1 g. ϵ=3.81; 3.80; 3.79).

By operating as above, the following compounds are prepared:

estra-2,4,10(1)-triene-17β-ol-[2,3-d]-1′-methyl-pyrazole
estra-2,4,10(1)-triene-17β-ol-[2,3-d]-1′-methyl-pyrazole-17-phenyl-propionate
19-nor-pregna-2,4,10(1)-triene-20--one-[2,3-d]-1′-methyl-pyrazole
6α-methyl-19-nor-pregna-2,4,10(1)-triene-17α-ol-20-one-[2,3-d]-1′-methyl-pyrazole
6α,16β-dimethyl-19-nor-pregna-2,4,10(1)-triene-17α,21-diol-20-one-[2,3-d]-1′-methyl-pyrazole
19-nor-cholesta-2,4,10(1)-triene-[2,3-d]-1′-methyl-pyrazole

EXAMPLE 4

6,16β-dimethyl-19-nor-pregna-2,4,10(1),6-tetraene-11β, 17α,21-triol-20-one-[2,3-d]-1′-phenyl-pyrazole To a solution of 2.25 parts of 2-hydroxymethylene-6, 16β - dimethyl - 17α,20:20,21-bismethylenedioxy-19-nor-pregna-4,6-diene-11β-ol-3-one in 22 parts of glacial acetic acid, there are added 0.5 part of sodium acetate and 0.86 part of phenyl-hydrazine hydrochloride. The mixture is warmed at 45° C. for 40 minutes and after cooling it is diluted with water. The precipitated product is extracted with methylene chloride. It is washed with water to neutrality and evaporated to dryness after dehydration on $Na_2SO_4$. The residue is chromatographed on alumina and from the hexane-methylene chloride fraction, there are obtained 1.75 parts of a product which, when crystallized from acetone, gives 1.47 parts of 6,16-dimethyl-17α,20: 20,21 - bismethylenedioxy-19-nor-pregna-4,6-diene-11β-ol-[3,2-c]-1′-phenyl-pyrazole. This compound is reacted in dioxane (40 parts) under reflux and under stirring for 30 hours with 1.5 parts of 10% Pd/C and 0.4 part of styrene. The catalyst is filtered off, the filtrate is evaporated to dryness, and, after crystallization from ethyl ether, there are obtained 1.02 parts of 6,16β - dimethyl-17α,20:20,21-bismethylenedioxy - 19-nor-pregna-2,4,10(1),6-tetraene-11β-ol-[2,3-d]-1′-phenyl-pyrazole.

0.5 part of this compound are heated on the water bath for 40 minutes with 30 parts of a 60% aqueous formic acid solution. Then, it is evaporated to dryness, a little water is added, and it is filtered. The crude product is dissolved in methanol, 0.1 part of a 2 N sodium methylate solution are added and the resulting mixture is maintained under a nitrogen current for 10 minutes. Then it is neutralized and evaporated to dryness. The solids are dissolved in methylene chloride, the organic phase is washed with water, which, after dehydration, is evaporated to dryness. By crystallization from acetone-hexane, there were obtained 0.18 part of 6,16β-dimethyl-19-nor-pregna-2,4,10(1),6 - tetraene - 11β,17α,21-triol-20-one-[2,3-d]-1′-phenyl-pyrazole.

In an analogous manner, the following compounds were prepared:

estra-2,4,10(1)-triene-17β-ol-[2,3-d]-1′-phenyl-pyrazole
estra-2,4,10(1)-triene-17β-ol-[2,3-d]-1′-phenyl-pyrazole-17-phenyl-propionate
17α-methyl-estra-2,4,10(1)-triene-17β-ol-[2,3-d]-1′-phenyl-pyrazole
17α-ethynyl-estra-2,4,10(1)-triene-17β-ol-[2,3-d]-1′-phenyl-pyrazole
17α-vinyl-estra-2,4,10(1)-triene-17β-ol-[2,3-d]-1′-phenyl-pyrazole
17α-ethyl-estra-2,4,10(1)-triene-17β-ol-[2,3-d]-1′-phenyl-pyrazole
16α-chloro-estra-2,4,10(1)-triene-17β-ol-[2,3-d]-1′-phenyl-pyrazole
estra-2,4,10(1)-triene-17-one-[2,3-d]-1′-phenyl-pyrazole
estra-2,4,10(1),16-tetraene-17β-ol-[2,3-d]-1′-phenyl-pyrazole-17-acetate
19-nor-pregna-2,4-10(1)-triene-17α-ol-20-one-[2,3-d]-1′-phenyl-pyrazole
19-nor-pregna-2,4,10(1),16-tetraene-20-one-[2,3-d]-1′-phenyl-pyrazole
19-nor-pregna-2,4,10(1)-triene-20-one-[2,3-d]-1′-phenyl pyrazole
19-nor-pregna-2,4,10(1)-triene-17α,21-diol-20-one-[2,3-d]-1′-phenyl-pyrazole
19-nor-cholesta-2,4,10(1)-triene-[2,3-d]-1′-phenyl-pyrazole.

EXAMPLE 5

19-nor-pregna-2,4,10(1)-triene-11β,17α,21-triol-2-one-[2,3-d]-1′-phenyl-3′-hydroxypyrazole A solution of 2α-cyano-17α,20:20,21-bismethylene-dioxy-19-nor-pregn-4-ene-11β-ol-3-one (4.20 parts) in 300 parts of ethanol is refluxed for 3 hours in a nitrogen current with 0.85 part of hydroxylamine hydrochloride dissolved in 2.5 parts of water. It is concentrated to ¼ of its volume and diluted with water. After one night at 0–3° C., 3.12 parts of 17α, 20:20,21-bismethylenedioxy-19-nor-pregn - 4-ene-11β-ol-[3,2-c]-5′-amino-isoxazole separate, which are collected by filtering, and dried under vacuum with $P_2O_5$. Of this compound 2.15 parts are dissolved in dry ethanol and, in an atmosphere of pure nitrogen, there are added 1.62 parts by weight of freshly distilled phenyl-hydrazine and the resulting mixture is autoclaved at 100° C. for 6 hours. It is evaporated to dryness, ethylacetate is added, it is washed with acid, water, alkali and water again, and it is crystallized to give 1.84 parts of 17α, 20:20,21 - bismethylenedioxy-19-nor-pregna-4-ene-11β-ol-[3,2-c]-phenyl-5′-hyroxy-pyrazole; $\lambda_{max}$ 283 mμ ($\epsilon$=20,-000).

1.25 parts of this product are dissolved in dioxane (50 parts) and treated with 0.6 part of 2,3 - dicyano - 5,6-dichloro-benzoquinone. Then, it is diluted with $CH_2Cl_2$, the precipitated hydroquinone is filtered off and the filtrate is percolated through an alumina column. By evaporating the eluates and crystallizing from acetone, there are obtained 0.63 part of 17α,20:20,21-bismethylenedioxy-19-nor-pregna-2,4,10(1)-triene-11β-ol-[2,3-d]-1′-phenyl - 3′-hydroxy-pyrazole.

Next, treatment with 60% formic acid and then with sodium methylate as described in the preceding example gives 0.215 part of 19-nor-pregna-2,4,10(1)-triene-11β, 17α,21-triol-20-one-[2,3-d]-1′-phenyl-3′ - hydroxy - pyrazole.

By starting from the corresponding [3,2-c]-1′-phenyl-5′-hydroxy-pyrazole of $\Delta^4$-19-nor-steroids, the following compounds are analogously prepared:

estra-2,4,10(1)-triene-17β-ol-[2,3-d]-1′-phenyl - 3′ - hydroxy-pyrazole
estra-2,4,10(1)-triene-17β-ol-[2,3-d]-1′ - phenyl - 3′ - hydroxy-pyrazole-17-acetate
17α-vinyl-estra-2,4,10(1)-triene-17β-ol-[2,3-d]-1′ - phenyl-3′-hydroxy-pyrazole
17α,20:20,21-bismethylenedioxy-19-nor - pregna - 2,4,10 (1)-triene-[2,3-d]-1′-phenyl-3′-hydroxy-pyrazole
19-nor-pregna-2,4,10(1)-triene - 17α,21 - diol - 20 - one-[2,3-d]-1′-phenyl-3′-hydroxy-pyrazole
19-nor-pregna-2,4,10(1)-triene-17α-ol-20 - one - [2,3-d]-1′-phenyl-3′-hydroxy-pyrazole
19-nor-pregna-2,4,10(1)-triene-20-one-[2,3-d]-1′ - phenyl-3′-hydroxy-pyrazole
19-nor-cholesta-2,4,10(1)-triene-[2,3-d]-1′ - phenyl - 3′-hydroxy-pyrazole

EXAMPLE 6

19-nor-cholesta-2,4,10(1)-triene-[2,3-d]-3′-iodo-pyrazole

To a solution of 4.8 parts of 19-nor-cholesta-4-ene-[3,2-c]-5′-amino-pyrazole in 60 parts of glacial acetic acid, there is added at 12–16° C. over a period of about 15 minutes a solution of 3 parts of sodium nitrite in 10 parts of water. While cooling, the nitrous acid excess is destroyed with urea, and the reaction mixture is neutralized with 4 N sodium hydroxide. A crystalline product separates which is removed by centrifugation and decantation of the supernatant and washed with water. Then, it is filtered and the residue, 19-nor-cholesta-4-en-[3,2-c]-5′-diazo-pyrazole, is dried under vacuum.

The product (3.2 parts) is suspended in 60 parts of acetone and while cooling to 0–5° C., 3 parts of hydrogen iodide and 4.8 parts of potassium iodide are added. The mixture is concentrated under vacuum, neutralized with 2 N sodium hydroxide, extracted with ethyl ether, washed with a sodium thiosulfate solution, and then with water to neutrality. It is evaporated to dryness and the residue is chromatographed through alumina to give 1.24 parts of 19-nor-cholesta-4-en-[3,2-c]-5' - iodo - pyrazole M.P. 138–142° C.; λ_max 258 mμ (ε=12,000).

To 0.8 part of this product dissolved in 80 parts of dioxane are added 0.19 part by weight of styrene and 0.5 part of 10% Pd/C. The resulting mixture is refluxed for 24 hours, the catalyst is filtered off, the filtrate is evaporated to dryness and by crystallizing from methanol, there are obtained 0.49 part of 19-nor-cholesta-2,4,10(1)-triene-[2,3-d]-3'-iodo-pyrazole.

EXAMPLE 7

Estra-2,4,10(1)-triene-17β-ol-[2,3-d]-3'-amino-pyrazole

To a mixture of 1.48 parts of 2-cyano-3-amino-estra-1,3,5(10)-triene-17β-ol in 125 parts of concentrated hydrogen chloride, cooled to 0° C., 0.45 part of sodium nitrite dissolved in the smallest possible amount of water are added dropwise. The whole product dissolves, and the so obtained diazonium salt is in turn added dropwise to a solution of 8 parts of stannous chloride in 30 parts of concentrated hydrogen chloride, while maintaining the temperature between 0 and 4.5° C. The precipitate which forms is filtered out, dissolved in water and methanol, and refluxed. This is followed by a hot decolorization with charcoal, filtration and alkalization to pH 12–13. The precipitate is separated, extracted with boiling benzene (2500 parts in toto), and then it is evaporated to dryness. By crystallizing from acetone there are obtained 0.46 part of pure estra-2,4,10(1)-triene-17β-ol-[2,3-d]-3'-amino-pyrazole.

In an analogous manner, there are prepared 17α-methyl-estra-2,4,10(1)-triene-17β-ol-[2,3-d]-3' - amino - pyrazole and 17α-ethyl-etsra-2,4,10(1)-triene-17β-ol-[2,3-d]-3'-amino-pyrazole.

EXAMPLE 8

19-nor-pregna-2,4,10(1)-triene - 11β - 17α,21 - triol - 20-one-[3,2-d]-1'-phenyl - 3' - amino - pyrazole - 17,21-diacetate 7 parts of 2α-cyano-19-nor-hydrocortisone are treated with 10 parts of acetic anhydride and 0.05 part of p-toluene sulfonic acid for 6 hours at room temperature. Ten parts of pyridine are added and it is thoroughly diluted with water. 7.05 parts of 2-cyano-19 - nor - pregna - 2,4-diene-3,11β,17α,21-tetra-ol-20-one-3,17,21 - triacetate are obtained.

6.6 parts of this compound, in a nitrogen current, are suspended in 50 parts of methanol and, while maintaining the temperature at about 10° C., 60 parts of 1% potash methanolic solution are added. After 5 minutes, it is neutralized with 5.5 parts of 15% aqueous acetic acid. Then, it is concentrated and thoroughly diluted with water. There are precipitated 5.84 parts of 2α-cyano-19-nor-pregna-4-en-11β,17α,21-diol-3,20 - dione - 17,21 - diacetate.

4.5 parts of this compound are refluxed in 250 parts of ethanol with 1.60 parts of phenyl-hydrazine hydrochloride and 1.50 parts of sodium acetate trihydrate, in a nitrogen atmosphere. The reaction mixture is concentrated and the crystals are filtered out, giving 19-nor-pregna-4-en-11β,17α,21-triol-20-one-[3,2-c]-1'-phenyl-5'-amino - pyrazole (2.18 parts).

This compound (1.72 parts) is refluxed in dioxane with 0.8 part of styrene and 1.4 parts of 10% Pd/C. After 2 hours the catalyst is filtered off, the filtrate is evaporated to dryness and crystallized from acetone to give 0.94 part of 19-nor-pregna-2,4,10(1)-triene-11β,17α,21 - triol - 20-one-[2,3-d]-1'-phenyl-3'-aminopyrazole.

By operating as in the above described dehydrogenation, there are prepared 19-nor-cholesta-2,4,10(1)-triene-[2,3-d]-1'-phenyl-3'-amino-pyrazole and estra-2,4,10(1)-triene-[2,3-d]-1'-phenyl-3'-amino-pyrazole.

EXAMPLE 9

Estra-2,4,10(1)-triene-17β-ol-[2,3-d]-1'-phenyl-3'-methoxy-pyrazole

To a suspension of 0.25 part of estra-2,4,10(1)-triene-17β-ol-[2,3-d]-1'-phenyl-3'-hydroxy-pyrazole in 5 parts of methanol, there is added an etheral diazomethane solution. The product dissolves entirely, and precipitates again by evaporating the solvent. The solution is filtered and by recrystallizing from methanol-methylene chloride, there are obtained 0.096 part of pure estra-2,4,10(1)-triene-17β-ol-[2,3-d]-1'-phenyl-3'-methoxy-pyrazole.

For a ready understanding of the nomenclature employed in the foregoing description of the invention, it is to be understood that the following is the structure and ring-numbering involved:

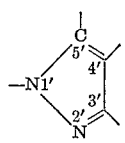 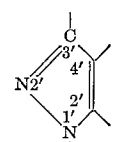

[3, 2-c]-pyrazoles      [2, 3-d]-pyrazoles

I claim:
We claim:
1. A compound of the formula

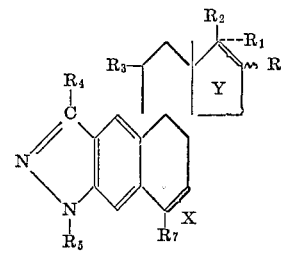

wherein R is a member selected from the group consisting of H, lower alkyl and halo; $R_1$ singly is a member selected from the group consisting of H, lower alkyl, vinyl, ethynyl, hydroxy and acyloxy in which the acyl radical is derived from an alkanoic acid of from 2 to 10 carbon atoms; $R_2$ singly is a member selected from the group consisting of hydroxy, acyloxy in which the acyl radical is derived from an acid selected from the group consisting of an alganoic acid of from 2 to 10 carbon atoms and phenylpropionic acid, —$C_8H_{17}$, —$COCH_3$, —$COCH_2OH$ and —$COCH_2O$-acyl in which acyl is an acyl radical derived from an alkanoic acid of 2 to 10 carbon atoms; $R_1$ and $R_2$ together constitute a member selected from the group consisting of keto and 17α, 20:20,21-bismethylenedioxy; $R_3$ is a member selected from the group consisting of H and hydroxy; $R_4$ is a member selected from the group consisting of H, hydroxy, lower alkoxy, I and amino; $R_5$ is a member selected from the group consisting of H, lower alkyl and phenyl; $R_7$ is a member selected from the group consisting of H and methyl and X and Y are each a member selected from the group consisting of a single and a double bond, a methyl group at the 6-position having an α-configuration when X is a single bond.

2. A method for the preparation of a compound as claimed in claim 1, comprising reacting with a hydrogen acceptor selected from the group consisting of styrene, stilbene and an alkyl ester of an acid selected from the group consisting of maleic, fumaric and cinnamic acids, the alkyl radical containing no more than 2 carbon atoms, in the presence of a hydrogen transfer agent selected from the group consisting of Pd/C and Pt/C and in a solvent selected from the group consisting of benzene, dioxane, iso-octane, acetone, ethylene glycol and mineral oil, a compound of one of the formulas

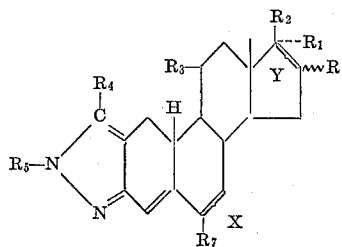

and

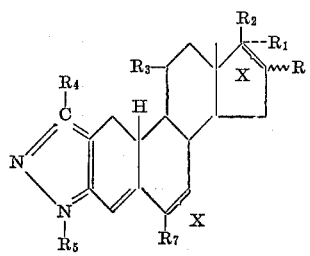

wherein R, $R_1$ and $R_2$, singly and together, $R_3$, $R_4$, $R_5$, $R_7$, X and Y have the meanings given in claim 1.

3. A method for the preparation of a compound as claimed in claim 1, comprising reacting with a hydrogen acceptor selected from the group consisting of chloranyl and 2,3-dicyano-5,6-dichloro-benzoquinone in a solvent selected from the group consisting of benzene, dioxane and acetone, a compound of one of the formulas

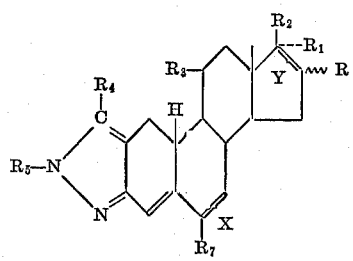

and

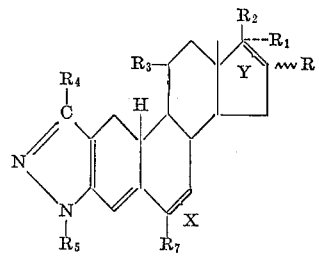

wherein R, $R_1$ and $R_2$, singly and together, $R_3$, $R_4$, $R_5$, $R_7$, X and Y have the meaning given in claim 1.

4. A method for the preparation of a compound as claimed in claim 1, comprising reacting with nitrous acid in a solvent comprising at least one member selected from the group consisting of water, concentrated hydrogen chloride, acetic acid, methanol, ethanol, isopropanol, propanol, dioxane, tetrahydrofurane, formamide and dimethylformamide, a compound of the formula

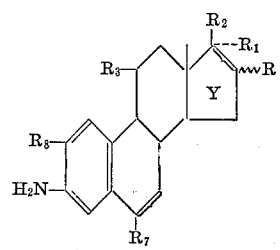

wherein R, $R_1$ and $R_2$, singly and together, $R_3$, $R_7$, X and Y have the meanings given in claim 1 and $R_8$ is a member selected from the group consisting of —C≡N, —CHO,

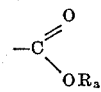

in which $R_a$ is a member selected from the group consisting of H and lower alkyl,

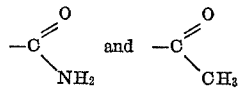

and reacting the resulting product with a stannous chloride solution.

No references cited.

HENRY A. FRENCH, Primary Examiner

U.S. Cl. X.R.

260—239.55, 999